March 18, 1924.
E. F. POTTER
1,487,599
AUTOMATIC FEEDER
Filed Dec. 28, 1922   2 Sheets-Sheet 1
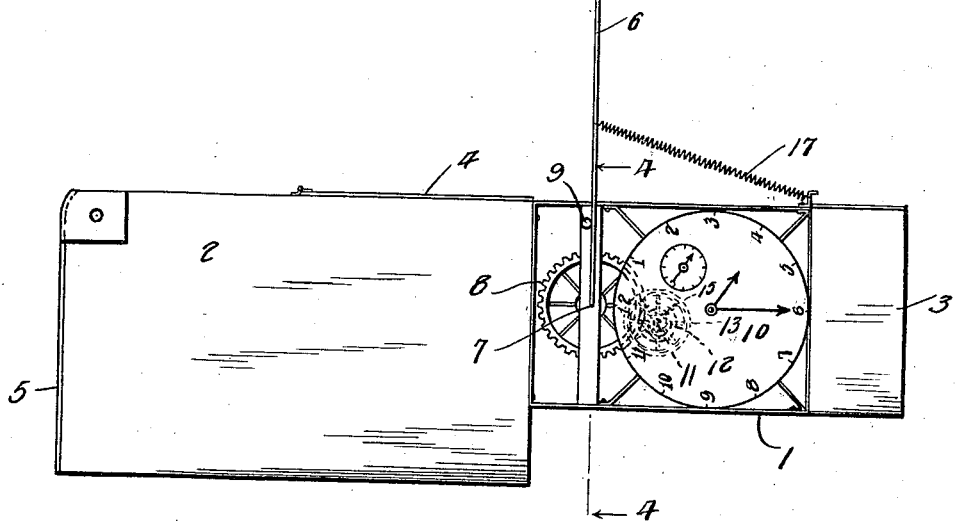
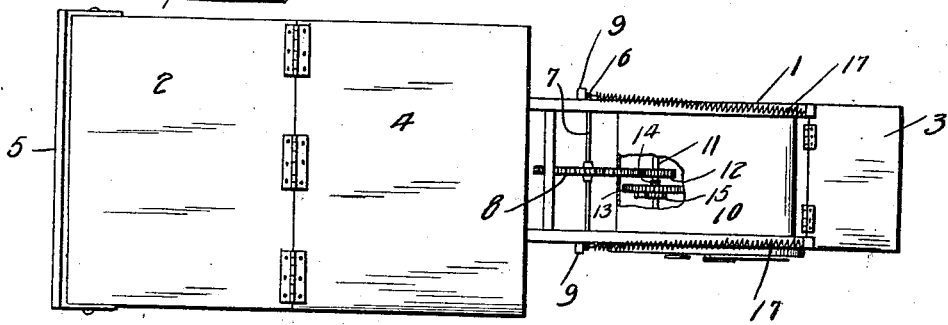
Inventor
E. F. Potter.
By [signature] Attorney March 18, 1924.
E. F. POTTER
AUTOMATIC FEEDER
Filed Dec. 28, 1922
1,487,599
2 Sheets-Sheet 2
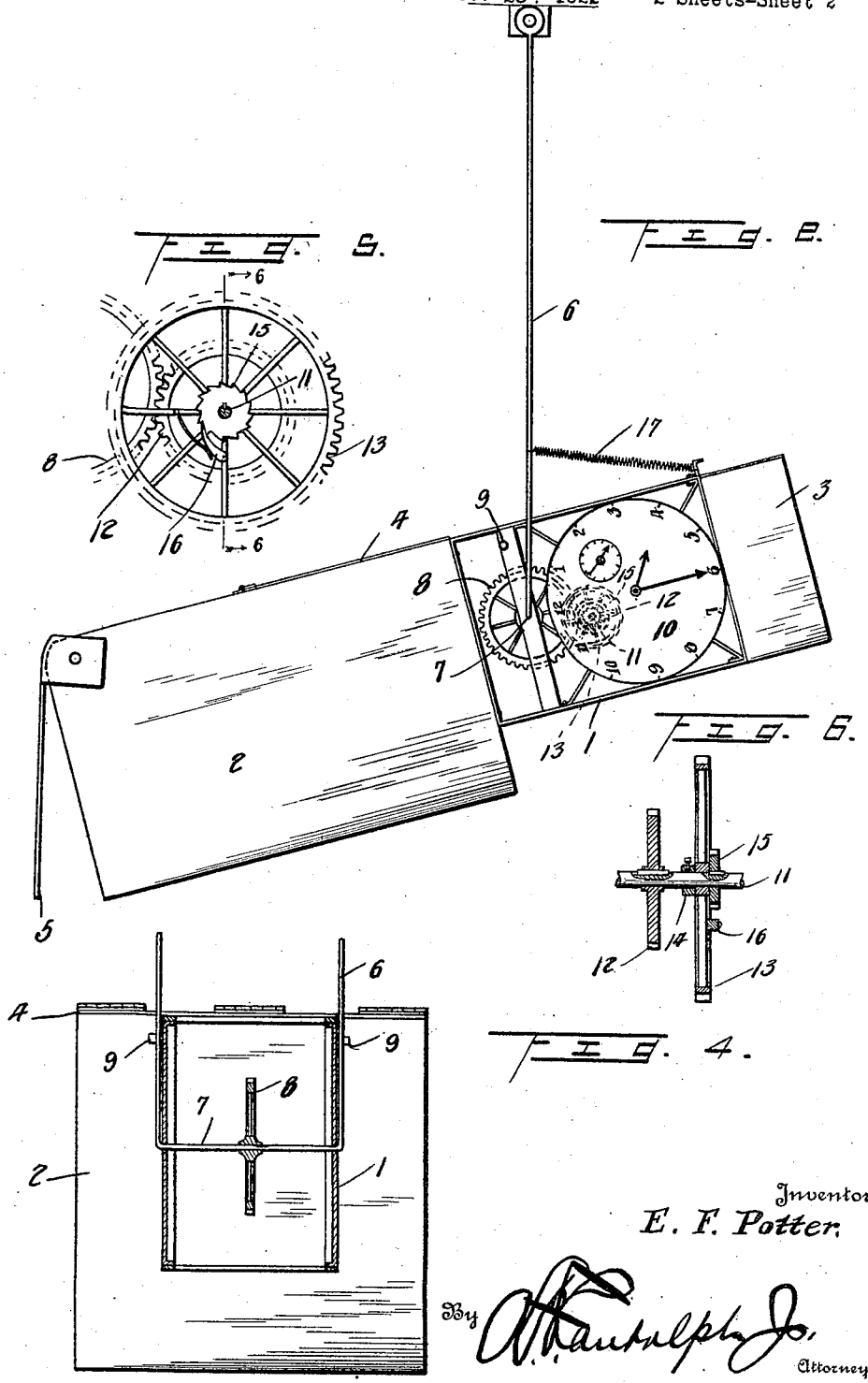
Inventor
E. F. Potter,
Attorney Patented Mar. 18, 1924.

1,487,599

UNITED STATES PATENT OFFICE.

EDWIN F. POTTER, OF WOODBRIDGE, NEW JERSEY.

AUTOMATIC FEEDER.

Application filed December 28, 1922. Serial No. 609,417.

*To all whom it may concern:*

Be it known that I, EDWIN F. POTTER, a citizen of the United States, residing at Woodbridge, in the county of Middlesex and State of New Jersey, have invented certain new and useful Improvements in an Automatic Feeder; and I do hereby declare the following to be a full, clear, and exact description of the invention, such as will enable others skilled in the art to which it appertains to make and use the same.

The invention relates to stock-feeding mechanism and more particularly to means for supplying feed to poultry at a predetermined time, with the result that the feeding may be regular without requiring the personal attention of the owner or individual charged with the feeding.

In accordance with the present invention, a box or other container is provided to receive the feed and is mounted to automatically dump by a pivotal movement, said box or container being counterbalanced, and a clock mechanism embodying a time-set release and adapted to be connected with the feed box or container to effect an automatic discharge of the feed at the predetermined time.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a side view of a poultry feeder embodying the invention,

Figure 2 is a view similar to Figure 1, showing the box or container tilted to dump the feed, Figure 3 is a top plan view, Figure 4 a section on the line 4—4 of Figure 1, Figure 5 is a detail view of a portion of the release mechanism, and Figure 6 is a section on the line 6—6 of Figure 5.

Corresponding and like parts are referred to in the following description and designated in the several views of the drawings by like reference characters.

The device comprises a frame 1 which is pivotally mounted and provided at opposite ends with boxes 2 and 3, the box 2 constituting a container to receive the feed and the box 3 being adapted to receive the counterbalance in the form of a suitable weight. The feed box 2 is provided with a top door 4 and an end door 5, the former providing for supply of the feed to the box and the door 5 automatically opening to admit of the discharge of the feed. Under normal conditions, the weight of the door 5 is sufficient to maintain it in closed position, but when the frame tilts, the door 5 automatically opens to admit of the delivery of the feed. After the feed has been discharged, the weight contained in the box 3 returns the parts to normal position.

A hanger 6 forms supporting means for the frame and said hanger is substantially of U-form, the frame 1 being pivotally mounted upon the lower crosspiece 7, upon which a gear wheel 8 is made fast in any preferred way. Stops 9, at opposite sides of the frame 1, engage the uprights of the hanger 6 and normally hold the frame in given position. The weight placed in the box 3 is sufficient to return the frame to normal horizontal position after the feed has been discharged, but is less than the combined weight of the container 2 and the feed therein, so that when the frame 1 is released by the time movement of the clock it will tilt to discharge the feed.

A clock 10, provided with the usual time-setting release mechanism, is mounted upon the frame 1, and the usual release shaft 11 is provided with a gear wheel 12 which is arranged with its teeth in mesh with the teeth of the gear wheel 8. The gear wheel 12 is keyed or otherwise secured to the shaft 11. A gear wheel 13 loose upon the shaft 11 forms a part of or cooperates with the release mechanism. The gear wheel 13 is confined between a set collar 14 and a ratchet wheel 15 which are secured to the shaft 11. A pawl 16 carried by the gear wheel 13 coacts with the teeth of the ratchet wheel 15 to prevent backward rotation of the gear wheel 13 and restrict its movement to a counter-clockwise direction. The gear wheel 13 is normally acted upon by the spring of the release mechanism when wound. When the gear wheel 13 is released by the time setting release mechanism, the frame 1 tilts and discharges the feed contained in the box 2 which, when lightened by the discharge of the feed, is returned to normal position by the weight contained in the box 3. As the frame 1 returns to normal position, the gear wheel 12 in mesh with the fixed gear wheel 8 rotates in a reverse direction, the ratchet mechanism 15 and 16 making provision for such reverse movement. A spring 17 interposed between the hanger 6 and the frame 1 prevents any jar when the frame assumes a normal position with stop pins 9 in contact with the side elements of the hanger.

What is claimed is:

1. An automatic feeder comprising a frame pivoted intermediate its ends, a container at one end of the frame for receiving the feed, a counterbalance at the opposite end of the frame, and a clock mechanism mounted upon the frame and adapted to release the latter at a predetermined time.

2. An automatic feeder comprising a hanger, a frame pivotally mounted upon the hanger, a box or container on the frame adapted to receive the feed, a fixed gear wheel in line with the axis of the frame, a clock mechanism mounted upon the frame and including a time-setting release mechanism, a gear wheel forming a part of the release mechanism and having ratchet connection therewith and in mesh with the said fixed gear wheel whereby to admit of an automatic discharge of the feed and a return of the frame to normal position.

3. An automatic feeder comprising a support, a frame pivotally mounted upon the support, boxes at opposite ends of the frame, the one adapted to receive the feed and the other containing a weight, a fixed gear wheel mounted upon the support in line with the axis of said frame, a clock mechanism mounted upon the frame and including a time-setting release mechanism, a gear wheel forming a part of the release mechanism and in mesh with said gear wheel for co-action therewith, a release gear wheel loosely mounted and adapted to be tripped, and a ratchet connection between the loose gear wheel and the gear wheel in mesh with the fixed gear wheel.

In testimony whereof I affix my signature in presence of two witnesses.

EDWIN F. POTTER.

Witnesses:
S. E. POTTER,
H. L. POTTER.